US007896224B2

(12) United States Patent
Temnykh

(10) Patent No.: US 7,896,224 B2
(45) Date of Patent: Mar. 1, 2011

(54) PERMANENT MAGNET TEMPORARY DEMAGNETIZATION TEMPERATURE RISE TECHNIQUE AND THEIR APPLICATION FOR SOLDERING

(75) Inventor: Alexander Temnykh, Ithaca, NY (US)

(73) Assignee: Cornell University, Ithaca, NY (US)

( * ) Notice: Subject to any disclaimer, the term of this patent is extended or adjusted under 35 U.S.C. 154(b) by 68 days.

(21) Appl. No.: 12/355,848

(22) Filed: Jan. 19, 2009

(65) Prior Publication Data

US 2009/0242617 A1 Oct. 1, 2009

Related U.S. Application Data

(60) Provisional application No. 61/024,780, filed on Jan. 30, 2008.

(51) Int. Cl.
*B23K 1/00* (2006.01)
*B23K 1/19* (2006.01)

(52) U.S. Cl. .............................. 228/262.4; 228/262.41; 228/262.42; 228/262.1; 228/102; 228/103

(58) Field of Classification Search .............. 228/262.4, 228/262.41, 262.42, 262.1, 102, 103; 269/37, 269/43, 44, 287, 87.3, 143, 147, 148, 156
See application file for complete search history.

(56) References Cited

U.S. PATENT DOCUMENTS

| | | | | |
|---|---|---|---|---|
| 6,214,480 | B1 * | 4/2001 | Hosoe et al. | 428/615 |
| 6,722,643 | B1 * | 4/2004 | Kurtz | 269/249 |

* cited by examiner

*Primary Examiner*—Jessica L Ward
*Assistant Examiner*—Erin B Saad
(74) *Attorney, Agent, or Firm*—Miller, Matthias & Hull, LLP

(57) ABSTRACT

A method for raising a demagnetization temperature of a permanent magnet is disclosed. The method provides a ferromagnetic arrangement around the magnet to increase demagnetization thresholds for the duration of soldering, or any other process requiring high temperatures. Using the method disclosed, it is possible to apply high levels of heat directly to permanent magnets without demagnetization, and more particularly to create permanent magnetic assemblies fit for any environment.

12 Claims, 7 Drawing Sheets

FIG. 1A

Magnetic ratings of the characteristics of the materials ( approximate values )

NdFeB = Neodymium, Eisen, Bor / neodymium, iron, boron
(Seltene Erde / rare earths)
p = kunstsoffgebunden / plastic-bonded

| Materials | | Remanence Br $B_r$ mT | Gauss | Intensity of the coercive field $_BH_C$ kA/m | Oe | $_JH_C$ kA/m | Oe | Maximum density of the residual energy (BxH) max (B x H) max. $KJ/m^3$ | $10^6G$ Oe | Density $\frac{g}{cm3}$ | Cure temperature °c | Maximum operating temperature °c | Coefficient of the residaual temperature per °C % | Demagnetizion curves |
|---|---|---|---|---|---|---|---|---|---|---|---|---|---|---|
| N65/70p | isotrop / isotropic | 640 | 6400 | 400 | 5050 | 670 | 8500 | 73 | 9 | 5.9 | 310 | 80 | -0.19 | |
| N33 | anisotrop / anisotropic | 1170 | 11700 | 836 | 10500 | 955 | 12000 | 263 | 33 | 7.4 | 310 | 80 | -0.12 | N33 |
| N35 | anisotrop / anisotropic | 1200 | 12000 | 868 | 10900 | 955 | 12050 | 270 | 34 | 7.4 | 310 | 80 | -0.12 | N35 |
| N38 | anisotrop / anisotropic | 1250 | 12500 | 899 | 11300 | 955 | 12000 | 310 | 37 | 7.4 | 310 | 80 | -0.12 | N33 |
| N40 | anisotrop / anisotropic | 1270 | 12700 | 923 | 11600 | 955 | 12000 | 310 | 39 | 7.4 | 310 | 80 | -0.12 | N40 |
| N42 | anisotrop / anisotropic | 1320 | 13200 | 923 | 11600 | 955 | 12000 | 342 | 43 | 7.4 | 310 | 80 | -0.12 | N42 |
| N45 | anisotrop / anisotropic | 1360 | 13600 | 876 | 11000 | 955 | 12000 | 350 | 44 | 7.4 | 310 | 80 | -0.12 | N45 |
| N48 | anisotrop / anisotropic | 1420 | 14200 | 836 | 10500 | 876 | 11000 | 390 | 49 | 7.4 | 310 | 80 | -0.12 | N48 |
| N35M | anisotrop / anisotropic | 1210 | 12100 | 868 | 10900 | 1114 | 14000 | 287 | 36 | 7.4 | 320 | 100 | -0.12 | N35M |
| N38M | anisotrop / anisotropic | 1250 | 12500 | 899 | 11300 | 1114 | 14000 | 310 | 37 | 7.4 | 320 | 100 | -0.12 | |
| N40M | anisotrop / anisotropic | 1280 | 12800 | 923 | 11600 | 1114 | 14000 | 326 | 41 | 7.4 | 320 | 100 | -0.12 | N40M |
| N42M | anisotrop / anisotropic | 1320 | 13200 | 923 | 11600 | 1114 | 14000 | 342 | 43 | 7.4 | 320 | 100 | -0.12 | N42M |
| N45M | anisotrop / anisotropic | 1380 | 13800 | 876 | 11000 | 1114 | 14000 | 366 | 46 | 7.4 | 320 | 100 | -0.12 | N45M |
| N30H | anisotrop / anisotropic | 1130 | 11300 | 810 | 10200 | 1353 | 17000 | 247 | 31 | 7.4 | 340 | 120 | -0.10 | N30H |
| N33H | anisotrop / anisotropic | 1170 | 11700 | 836 | 10500 | 1353 | 17000 | 263 | 33 | 7.4 | 340 | 120 | -0.10 | N33H |
| N35H | anisotrop / anisotropic | 1180 | 11800 | 868 | 10900 | 1353 | 17000 | 264 | 33 | 7.4 | 340 | 120 | -0.10 | |
| N38H | anisotrop / anisotropic | 1250 | 12500 | 899 | 11300 | 1353 | 17000 | 310 | 37 | 7.4 | 340 | 120 | -0.10 | N38H |
| N40H | anisotrop / anisotropic | 1280 | 12800 | 923 | 11600 | 1353 | 17000 | 326 | 41 | 7.4 | 340 | 120 | -0.10 | N40H |
| N42H | anisotrop / anisotropic | 1320 | 13200 | 955 | 12000 | 1353 | 17000 | 342 | 43 | 7.4 | 340 | 120 | -0.10 | N42H |
| N30SH | anisotrop / anisotropic | 1130 | 11300 | 810 | 10200 | 1592 | 20000 | 247 | 31 | 7.4 | 340 | 150 | -0.10 | N30SH |
| N33SH | anisotrop / anisotropic | 1170 | 11700 | 844 | 10600 | 1592 | 20000 | 263 | 33 | 7.4 | 340 | 150 | -0.10 | N33SH |
| N35SH | anisotrop / anisotropic | 1180 | 11800 | 876 | 11000 | 1592 | 20000 | 272 | 34 | 7.4 | 340 | 150 | -0.10 | N35SH |
| N38SH | anisotrop / anisotropic | 1250 | 12500 | 907 | 11400 | 1592 | 20000 | 310 | 37 | 7.4 | 340 | 150 | -0.10 | N38SH |
| N40SH | anisotrop / anisotropic | 1280 | 12800 | 939 | 11800 | 1592 | 20000 | 326 | 41 | 7.4 | 340 | 150 | -0.10 | N40SH |
| N45SH | anisotrop / anisotropic | 1350 | 13500 | 1003 | 12600 | 1592 | 20000 | 354 | 44 | 7.4 | 340 | 150 | -0.10 | |
| N28UH | anisotrop / anisotropic | 1060 | 10600 | 764 | 9600 | 1990 | 25000 | 216 | 27 | 7.4 | 350 | 180 | -0.10 | N28UH |
| N30UH | anisotrop / anisotropic | 1130 | 11300 | 812 | 10200 | 1990 | 25000 | 247 | 31 | 7.4 | 350 | 180 | -0.10 | N30UH |
| N33UH | anisotrop / anisotropic | 1170 | 11700 | 852 | 10700 | 1990 | 25000 | 263 | 33 | 7.4 | 350 | 180 | -0.10 | N36UH |
| N28EH | anisotrop / anisotropic | 1090 | 10900 | 780 | 9800 | 2388 | 30000 | 231 | 29 | 7.4 | 350 | 200 | -0.10 | N28EH |
| N30EH | anisotrop / anisotropic | 1140 | 11400 | 812 | 10200 | 2388 | 30000 | 240 | 30 | 7.4 | 350 | 200 | -0.10 | N30EH |

PERMANENT MAGNET TEMPORARY DEMAGNETIZATION TEMPERATURE RISE TECHNIQUE AND THEIR APPLICATION FOR SOLDERING

CROSS-REFERENCE TO RELATED APPLICATION

This application is a non-provisional application claiming the priority benefit under 35 U.S.C. 119(e) of U.S. provisional application No. 61/024,780, filed on Jan. 30, 2008.

FIELD OF THE DISCLOSURE

The present disclosure relates to permanent magnets and, more particularly, to a method of temporarily increasing the demagnetization temperatures of permanent magnets for use with soldering.

BACKGROUND OF THE DISCLOSURE

Permanent magnets are one of the most basic types of magnets that exist today. Essentially, permanent magnets are metal alloys that are capable of retaining at least some degree of magnetization. The metal alloys are initially magnetized by exposure to a magnetic field of an external source, and in turn retain the magnetization for relatively long periods of time. Common metal alloys used as permanent magnets include Neodymium-Iron-Boron (NdFeB), Samarium-Cobalt (SmCo), Aluminum-Nickel-Cobalt (Alnico), or the like. As each metal alloy exhibits a different characteristic, one metal alloy may be preferred over another based on the application. For instance, the alloy NdFeB provides the highest magnetic field strength with respect to other alloys. Accordingly, NdFeB is preferred for more critical applications requiring stronger magnetic fields for very dense and or compact assemblies.

Permanent magnet assemblies are used in a wide variety of applications including many industrial and scientific processes. While each application may vary, permanent magnets are increasingly being used for more delicate applications involving compact assemblies, in-vacuum processes, high levels of radiation, and any combinations thereof. For such conditions, it is important to consider the size, the resistance to radiation, and the rate of outgassing of the magnet assemblies. Accordingly, efforts to prepare permanent magnet assemblies for use in such conditions have intensified.

Permanent magnets may be assembled in a number of ways. One such method simply fastens permanent magnet assemblies together mechanically. However, mechanical attachments tend to occupy more space, which may cause problems for dense and compact applications. Gluing or using adhesives is a more compact way to prepare permanent magnet assemblies. Although adhesives take up significantly less space than mechanical fixtures, adhesives are susceptible to radiation and may easily fall apart when exposed to high levels of radiation. Furthermore, adhesives are also a major source of outgassing and gradually release significant amounts of gas into the surrounding environment. This is a major problem for in-vacuum assemblies because the released gas may condense onto and distort functionality of optical elements, thermal radiators, solar cells, or other vital equipment.

Another method typically used for such assemblies involve soldering. Soldering takes less space to implement than mechanical fixtures and is ideal for more compact assemblies. It is also more resistive to radiation and exhibits significantly smaller rates of outgassing than adhesives, which are ideal characteristics for high temperature and in-vacuum applications. However, the high temperatures involved in soldering adversely affect the magnetic properties of a permanent magnet. More specifically, exposing a magnet to temperatures exceeding its maximum operating temperature, can easily demagnetize the magnet, or at the least, significantly distort its magnetic properties.

Referring to the table of FIG. 1A, magnetic characteristics of common NdFeB alloys that may be used to form a permanent magnet are provided. For instance, the magnetic characteristics of a N40SH alloy are shown to have a maximum energy product of $41\times10^6$G·Oe, a maximum operating temperature of 150° C. and a demagnetization Curie temperature of 340° C. Accordingly, if the N40SH alloy is exposed to temperatures ranging between 150° C. and 340° C., its magnetic properties are distorted and a full recovery is not possible. If the N40SH alloy is exposed to temperatures exceeding 340° C., the alloy is demagnetized and no recovery is possible.

The graphs of FIGS. 1B and 1C further define various relationships between the magnetic properties of the N40SH alloy and temperature. In general, the demagnetization curves B1-B6 of FIG. 1B illustrate the changes in the magnetic flux density and magnetic field intensity with respect to changes in temperature. The plot of FIG. 1C summarizes the linear relationship between the demagnetization temperature and the minimum of the magnetic field flux density in the alloy. In the graph of FIG. 1B, demagnetization characteristics are provided for different temperatures, for example 23° C. (curve B1), 60° C. (curve B2), 100° C. (curve B3), 120° C. (curve B4), 150° C. (curve B5) and 180° C. (curve B6). Furthermore, some of the demagnetization curves B3-B6 have knees K3-K6, respectively. The knees of curves B1 and B2 have been cutoff and are not shown in FIG. 1B. The projection of the knees K3-K6 on the right axis represents the minimum magnetic field density for a given alloy at the respective temperatures. For instance, the demagnetization curve B4 at 120° C. has a knee K4 at a magnetic field flux density of approximately 0.35T (3.5 kGs). This means that, at 120° C., demagnetization will occur if the magnetic field density inside the permanent magnet is reduced to 0.35T (3.5 kGs) or less. This further implies that, if the magnetic field flux density inside the permanent magnet is reduced to 0.35T (3.5kGs), the magnet will be demagnetized at a temperature of 120° C.

Typical solder, such as a 63/37 Tin-Lead alloy, melts at temperatures of approximately 180° C. To ensure the solder has melted completely, the heat provided to melt the solder may exceed well beyond the rated melting point. For instance, soldering irons typically provide heat of approximately 250° C. for applying a type of solder having a 190° C. melting point. Alternatively, ovens may be used to bake the solder at temperatures closer to, but still exceeding, the solder melting point. In any case, soldering temperatures still exceed maximum demagnetization limits of typical NdFeB magnets. More specifically, soldering a N40SH magnet may heat the magnet to temperatures well above its maximum operating temperature of 120° C., and consequently demagnetize, or at the least, distort the magnetic properties of the magnet even long after the heat is removed.

In light of the foregoing, there is a need for a method that modifies a permanent magnet so as to increase its demagnetization temperature, thereby allowing the permanent magnet to undergo high-temperature processes, such as soldering, without affecting its magnetic properties.

SUMMARY OF THE DISCLOSURE

In accordance with one aspect of the disclosure, a soldered permanent magnet assembly is provided. The permanent magnet assembly is prepared by a process which provides a permanent magnet, the permanent magnet having a demagnetization temperature; provides an arrangement of ferromagnetic material around the permanent magnet so as to increase the demagnetization temperature to a second demagnetization temperature; positions a metal in close proximity to the permanent magnet; provides a solder between the permanent magnet and the metal, the solder having a melting point greater than the demagnetization temperature but lower than the second demagnetization temperature; bakes the solder to a baking temperature, the baking temperature being greater than the solder melting point but less than the second demagnetization temperature; and removes the arrangement of ferromagnetic material from the permanent magnet.

In accordance with another aspect of the disclosure, a method for temporarily raising a demagnetization temperature of a permanent magnet for use with a high temperature process is provided. The method comprises the steps of providing an arrangement of ferromagnetic material around the permanent magnet so as to increase the demagnetization temperature to a second demagnetization temperature; applying a high temperature process onto the permanent magnet; and removing the arrangement of ferromagnetic material from the permanent magnet.

In accordance with another aspect of the disclosure, a method for temporarily raising a demagnetization temperature of a permanent magnet for soldering to a metal is provided. The method comprises the steps of providing an arrangement of ferromagnetic material around the permanent magnet so as to increase the demagnetization temperature to a second demagnetization temperature; positioning the metal in close proximity to the permanent magnet; providing a solder between the permanent magnet and the metal, the solder having a melting point greater than the demagnetization temperature but lower than the second demagnetization temperature; baking the solder to a baking temperature, the baking temperature being greater than the solder melting point but less than the second demagnetization temperature; and removing the arrangement of ferromagnetic material from the permanent magnet.

In accordance with another aspect of the disclosure, a ferromagnetic arrangement for raising a demagnetization temperature of a permanent magnet is provided. The ferromagnetic arrangement comprises a top section and a bottom section, each of the top and bottom sections having a length substantially longer than a length of the permanent magnet and a width substantially wider than a width of the permanent magnet; and a side section having a length substantially longer than the length of the permanent magnet, a width substantially shorter than the width of the top and bottom sections, and a height substantially equal to a maximum height of the permanent magnet, the side section being lengthwise disposed between the top and bottom sections, the top, bottom and side sections completely covering at least three surfaces of the permanent magnet and exposing at least one side of the permanent magnet for soldering.

These and other aspects of this disclosure will become more readily apparent upon reading the following detailed description when taken in conjunction with the accompanying drawings.

BRIEF DESCRIPTION OF THE DRAWINGS

FIG. 1A is a table providing magnetic characteristics of various Neodymium-Iron-Boron metal alloys by Maurer Magnetic AG;

Figure 1B:
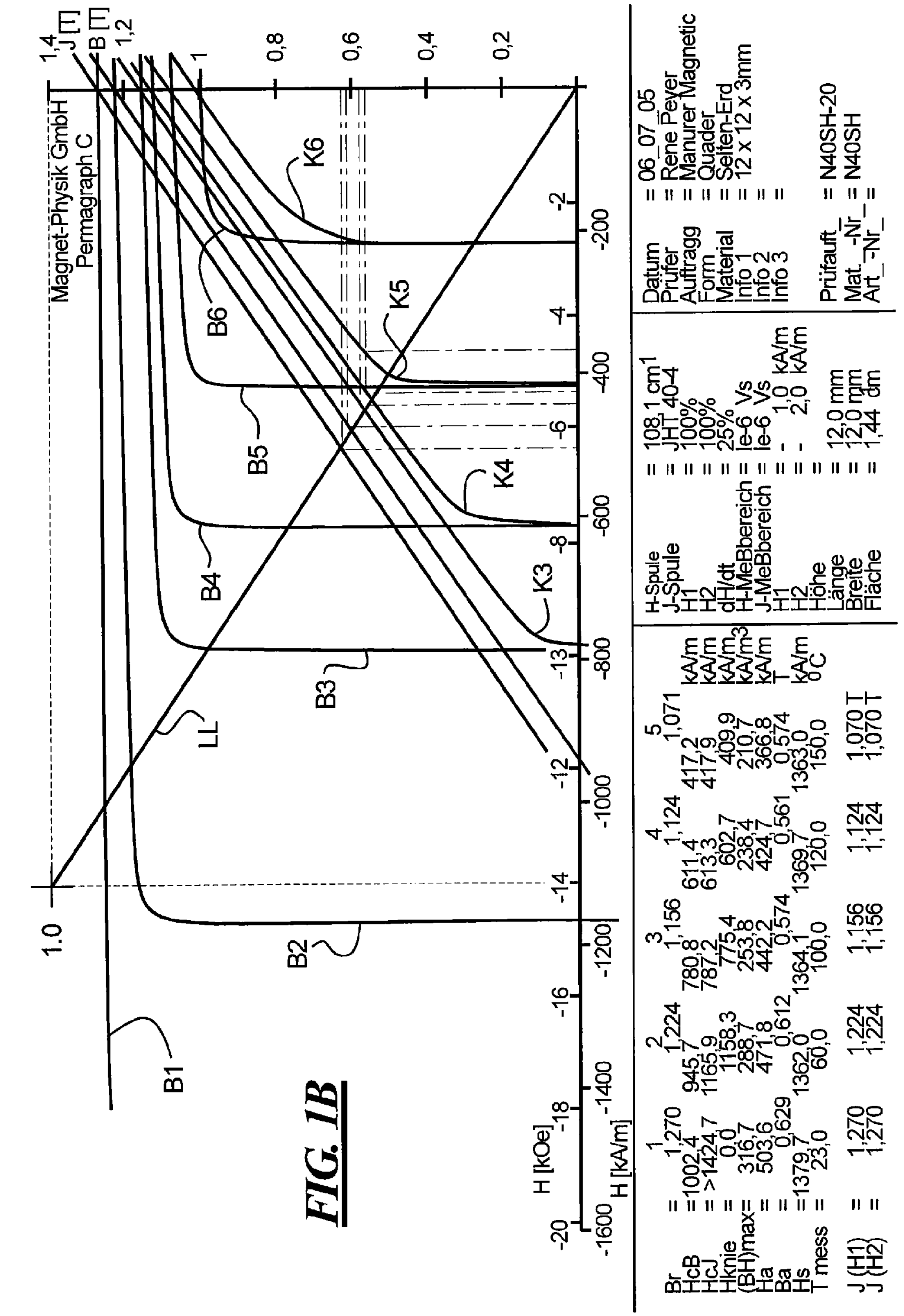
FIG. 1B is a graph providing demagnetization curves of the N40SH metal alloy at different temperatures by Maurer Magnetic AG.

[1] Selecting Table Magnetic Rating of the Characteristics of the Materials [online]. Maurer Magnetic AG, 2007 [retrieved on Oct. 12, 2007]. Retrieved from the Internet: <URL:http://www.maurermagnetic.ch/PDF/51_E.pdf>.

[2] Demagnetization Curve [online]. Maurer Magnetic AG, 2005 [retrieved on Oct. 12, 2007]. Retrieved from the Internet: <URL:http://www.maurermagnetic.ch/Entmagnteisierungskurven/N40SH.pdf>.

While the present disclosure is susceptible to various modifications and alternative constructions, certain illustrative embodiments thereof have been shown in the drawings and will be described below in detail. It should be understood, however, that there is no intention to limit the present invention to the specific forms disclosed, but on the contrary, the intention is to cover all modifications, alternative constructions, and equivalents falling with the spirit and scope of the present invention.

DETAILED DESCRIPTION

Figure 2:
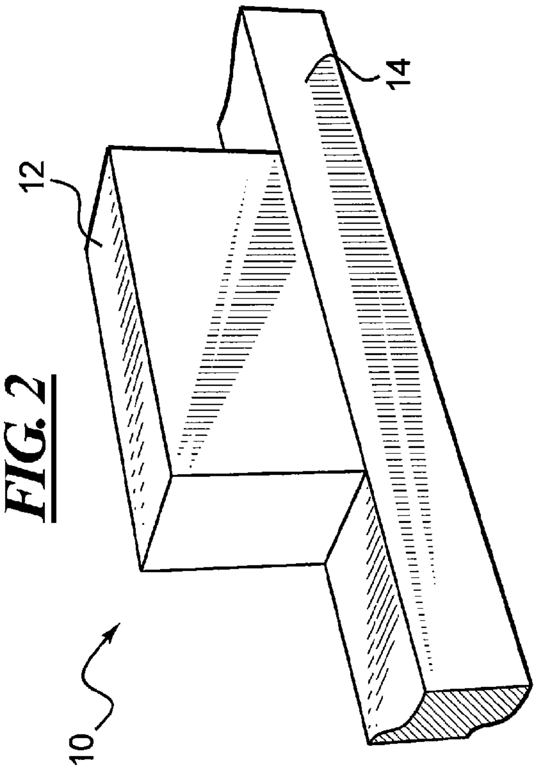
FIG. 2 is a perspective view of an exemplary permanent magnet assembly constructed in accordance with the teachings of the disclosure.

Referring now to the drawings and with particular reference to FIG. 2, an exemplary permanent magnet assembly constructed using the temperature rise technique disclosed is referred to as reference numeral 10. It is to be understood that the teachings of the disclosure can be used to construct permanent magnet assemblies above and beyond that specifically disclosed below. One of ordinary skill in the art will readily understand that the following are only exemplary embodiments and methods.

As shown in FIG. 2, a permanent magnet assembly 10 formed in accordance with the method of the disclosure may include a permanent magnet 12 soldered to a surface of a metal 14, for example, copper, iron, steel, or the like. The permanent magnet 12 may be made of metal alloys, for example, Neodymium-Iron-Boron (NdFeB), Samarium-Cobalt (SmCo), Aluminum-Nickel-Cobalt (Alnico), or the like. Although soldering is the most effective for more delicate, in-vacuum applications exposed to high levels of radiation, the process of melting the solder adversely affects the magnetic properties of a permanent magnet 12. More specifically, soldering involves heating the solder and the assembly 10 to at least the solder melting point, which may significantly distort or demagnetize a typical permanent magnet 12.

In order to avoid demagnetization, it may be necessary to raise the demagnetization temperature of the permanent magnet 12 by arranging ferromagnetic material around the magnet 12. More specifically, the magnetic field generated by the ferromagnetic arrangement decreases the demagnetization forces within the permanent magnet 12. As a result, the demagnetization temperature of the permanent magnet 12 is increased for as long as the ferromagnetic materials surround the permanent magnet 12. Once the increased demagnetization temperature is greater than the solder melting point, solder may be successfully applied without affecting the magnetic properties of the permanent magnet 12.

Figure 3A:
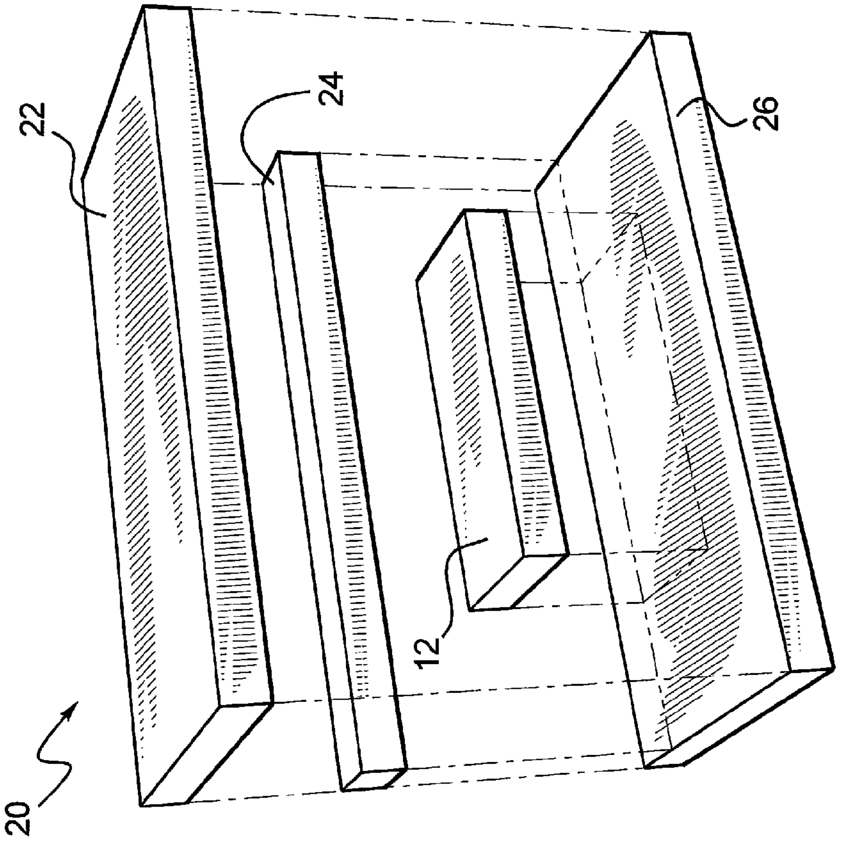
FIG. 3A is an exploded perspective view of an exemplary ferromagnetic arrangement constructed in accordance with the teachings of the disclosure.
Figure 3B:
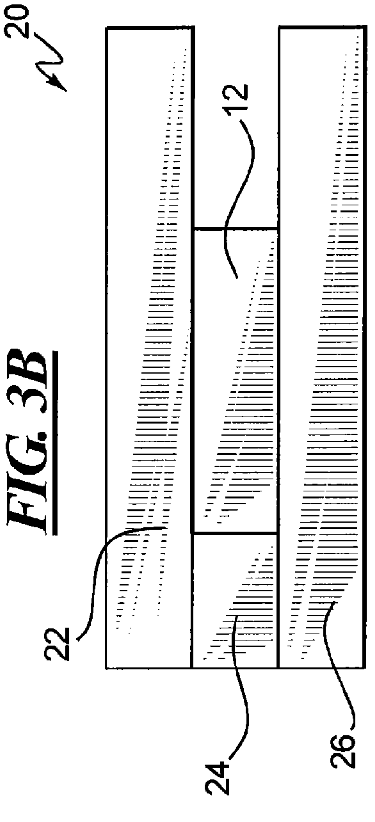
FIG. 3B is a side view of the ferromagnetic arrangement of FIG. 3A.

Referring now to FIGS. 3A and 3B, an exemplary arrangement 20 of ferromagnetic material, or steel, may be provided around the permanent magnet 12 of FIG. 2. The ferromagnetic arrangement 20 may include a top section 22, a side section 24 and a bottom section 26 separately sized so as to evenly hold a permanent magnet 12 therebetween. More specifically, the height of the side section 24 may preferably be the same height as the permanent magnet 12, as shown in the side view of FIG. 3B. Although the ferromagnetic arrangement 20 may be sized differently than shown, the top and bottom sections 22, 26 are preferably large enough to fully cover the respective surfaces of the permanent magnet 12. Furthermore, the arrangement 20 and the permanent magnet 12 may be held together using clamps, screws, bolts, adhesives, or the like.

Figure 4:
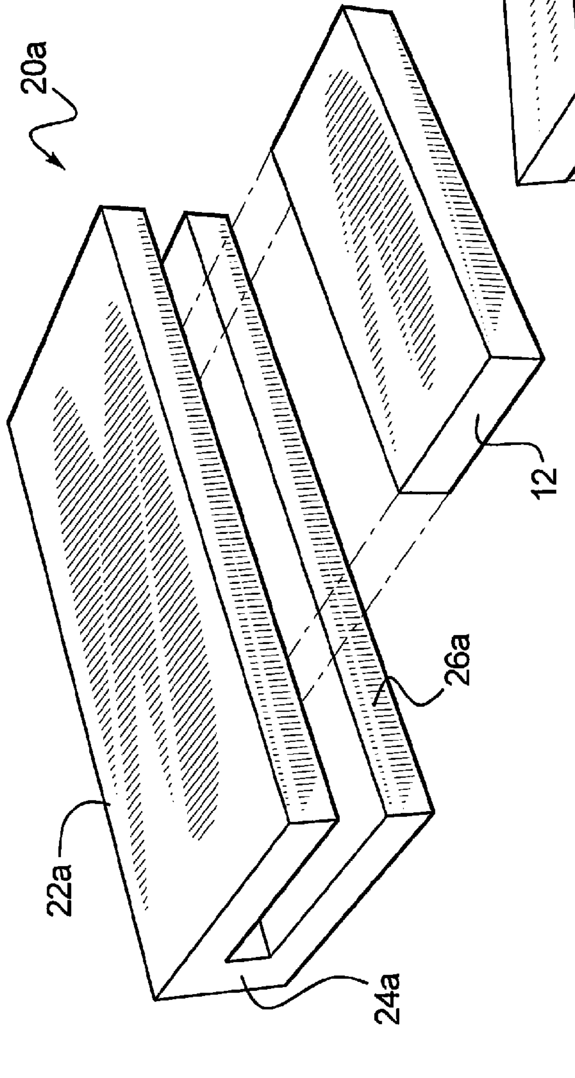
FIG. 4 is a perspective view of another ferromagnetic arrangement.

Turning to FIG. 4, an alternative arrangement 20*a* is provided to receive the permanent magnet 12 of FIG. 2. As in the previous embodiment, the ferromagnetic arrangement 20*a* may also include a top section 22*a*, a side section 24*a* and a bottom section 26*a*. However, the sections may be formed from one body and not separable bodies. Accordingly, the permanent magnet 12 may be inserted into a slot formed by the top and bottom sections 22*a*, 26*a*. In contrast to other embodiments, clamps or other means for holding the arrangement 20a and the magnet 12 together may be omitted.

Figure 5:
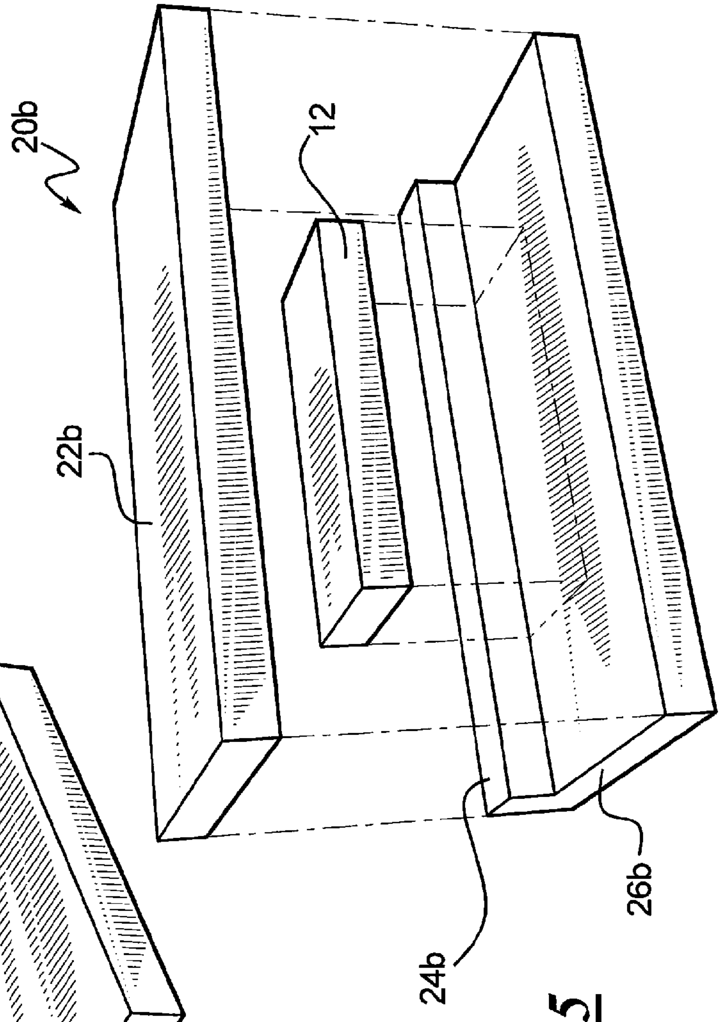
FIG. 5 is an exploded perspective view of another ferromagnetic arrangement.

As shown in FIG. 5, yet another arrangement 20*b* is provided to receive the permanent magnet 12 of FIG. 2. As with previous embodiments, the ferromagnetic arrangement 20*b* may include a top section 22*b*, a side section 24*b* and a bottom section 26*b*. However, the arrangement 20*b* may comprise only two separable bodies. The top section 22b may comprise one body while the side and bottom sections 24*b*, 26*b* may form another body. As with the embodiment of FIGS. 3A and 3B, the arrangement 20*b* may be held together using clamps, screws, bolts, adhesives, or the like.

Figure 6B:
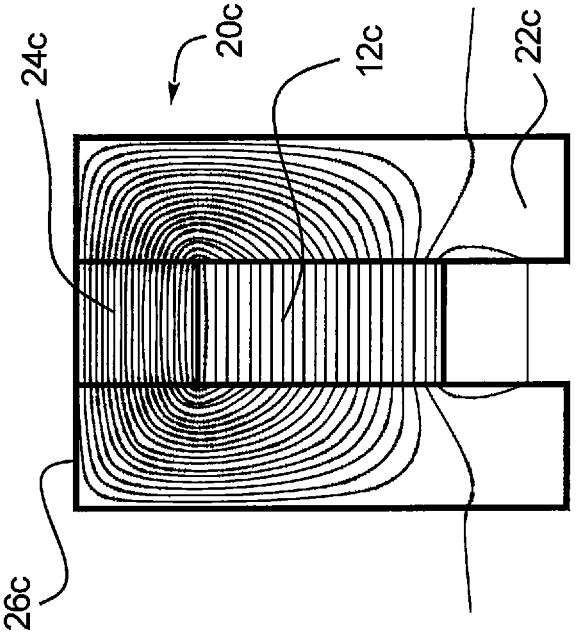
FIG. 6B is a side view of the permanent magnet of FIG. 6A with a ferromagnetic arrangement and corresponding magnetic field lines.
Figure 6A:
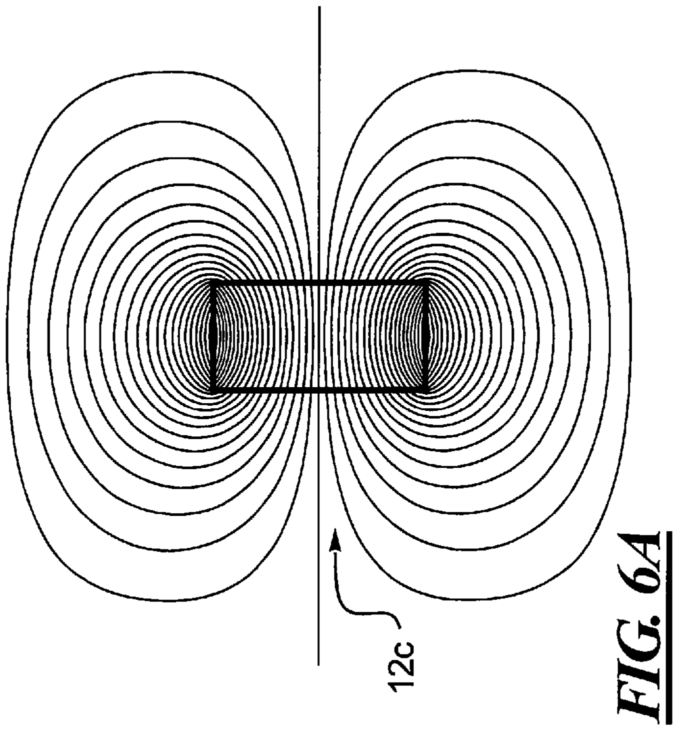
FIG. 6A is a side view of an exemplary permanent magnet with corresponding magnetic field lines.

Referring now to FIGS. 6A and 6B, simulated models further describe the positive effects of arranging ferromagnetic material 20*c*, such as steel, around a permanent magnet 12*c*. The exemplary model of the permanent magnet 12*c* is 1.00 in. long, 0.50 in. wide and 0.25 in. thick but other dimensions are certainly possible. The magnet 12*c* was further modeled assuming a N40SH grade NdFeB metal alloy having a residual induction of Br=12.6 kGs. Alternatively, the models may use permanent magnets of other shapes, sizes and grade. As shown by the resulting field lines of FIG. 6A, the magnetic field within the permanent magnet 12*c* is unevenly distributed. Moreover, simulated data indicates the region with minimum field line density is approximately 3.880 kGs at the center of the magnet 12*c*. Using the maximum energy product, $41\times10^{6}$G·Oe, of the N40SH alloy from the table of FIG. 1A, the minimum field line density can be converted to a demagnetizing force of 10.5 kOe at the center location.

Figure 1C:
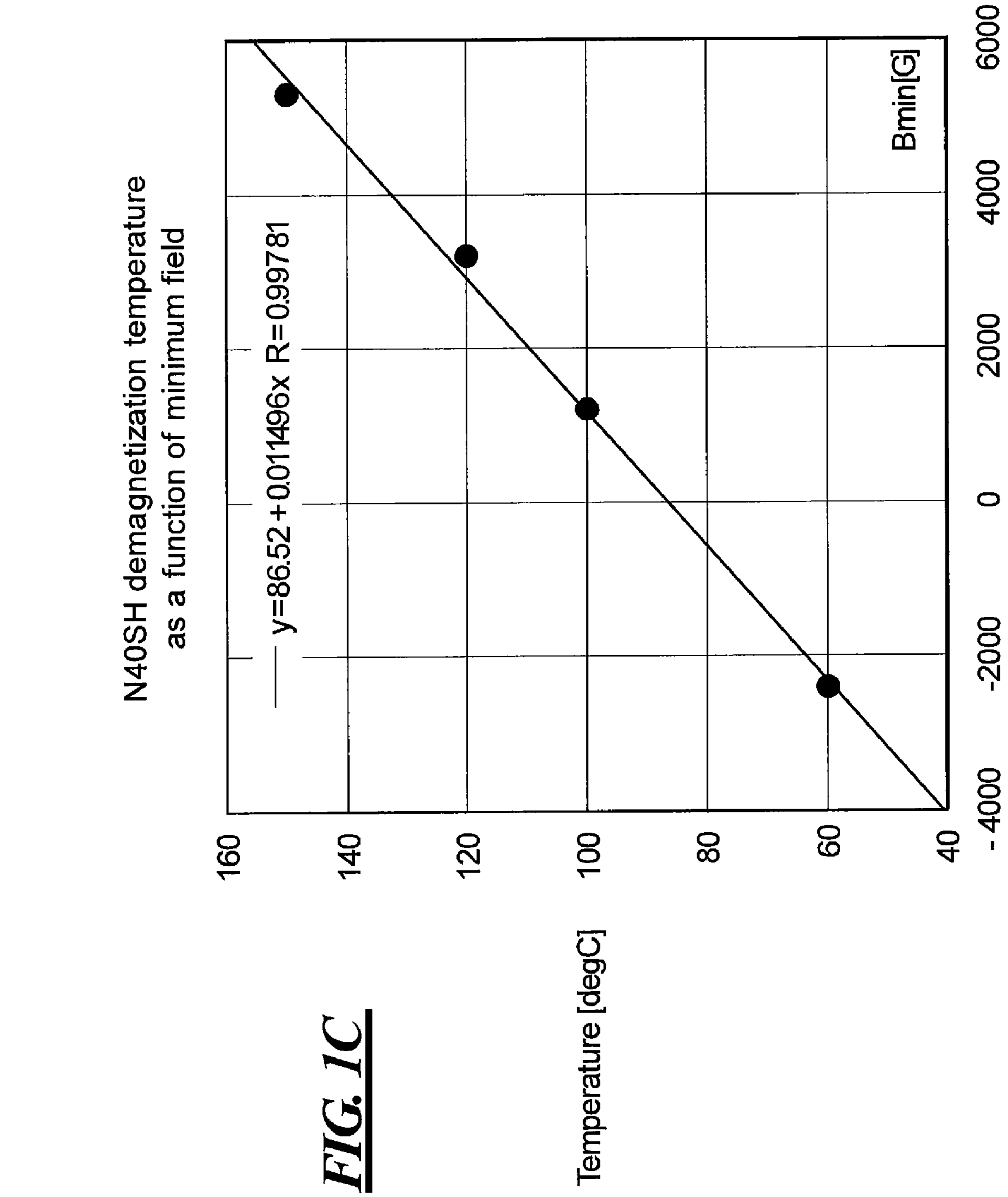
FIG. 1C is a graph of the relationship between demagnetization temperature and minimum magnetic field density for the N40SH metal alloy fitted with a linear function.

To estimate the demagnetization temperature of the permanent magnet 12*c*, the relationships of FIGS. 1B and 1C may be employed. As the minimum magnetic field corresponds to the knees K3-K6 of the demagnetization curves B3-B6, it is possible to estimate the demagnetization temperature using the minimum magnetic field density provided. For example, in FIG. 1B, a minimum magnetic field density of 3.880 kGs comes closest to the knee K4 of curve B4. As curve B4 corresponds to magnetic characteristics at 120° C., the estimated demagnetization temperature of the permanent magnet 12*c* is approximately 120° C. Alternatively, it is possible to determine a more precise and direct estimate by using the graph of FIG. 1C. Using this linear relationship, the demagnetization temperature of the N40SH magnet is approximately 128° C. at a minimum magnetic field density of 3.880 kGs. In any case, the demagnetization temperature of the permanent magnet 12*c* is too low for use with a solder having a melting point of at least 180° C.

In the simulated model of FIG. 6B, an exemplary ferromagnetic arrangement 20*c*is provided around the permanent magnet 12*c* of FIG. 6A. As with the embodiment of FIGS. 3A and 3B, the arrangement 20*c* includes three separable steel bodies having, for example, a top section 22*c*, a side section 24*c* and a bottom section 26*c*. The arrangement 20*c* is sized and positioned so as to evenly receive the permanent magnet 12*c*therebetween. As the theoretical magnetic field lines indicate, the magnetic field inside the magnet 12*c* is very uniform. More specifically, simulated data further indicates a consistent magnetic field density of no less than 11.2 kGs within the magnet 12*c*, which corresponds to no more than 1 kOe of demagnetizing force throughout the magnet 12*c*. Using the demagnetization curves B1-B6 as with the first model, a minimum magnetic field density of 1 kOe corresponds to at least 200° C. Additionally, using the relationship of FIG. 1C, a minimum magnetic field density of 1 kOe corresponds to approximately 217° C., which is now much higher than the solder melting point. Upon comparing the theoretical models of FIGS. 6A and 6B, it can be seen that an arrangement of ferromagnetic material is expected to increase the demagnetization temperature of a permanent magnet to allow for soldering.

As shown in the above models, the ferromagnetic arrangements disclosed herein may be used to raise the demagnetization temperatures of permanent magnets for applications involving relatively high levels of heat. In general, if a process exposes a permanent magnet to temperatures close to or exceeding its maximum operating temperature, then ferromagnetic material may be removably arranged on the magnet for the duration of that process to prevent demagnetization. Once the process involving high levels of heat are complete, the ferromagnetic arrangement may be removed from the permanent magnet to restore it to its initial state.

As the process of soldering also involves such high levels of heat, a specific method for raising a demagnetization temperature of a permanent magnet for soldering to a metal may include the following. To increase the demagnetization temperature of the magnet before soldering, ferromagnetic material may be removably arranged on the surface of the permanent magnet. Preferably, the ferromagnetic arrangement may cover a majority of the magnet while leaving at least one side or surface to be soldered, uncovered. The metal to be soldered may be positioned in close proximity to the uncovered magnet surface, and solder may be positioned between the metal and the magnet. At this point, the demagnetization temperature of the permanent magnet may be higher than the melting point of the solder. Subsequently, the solder and the assembly may be baked to a temperature that is greater than the solder melting point but less than the altered demagnetization temperature so as to melt the solder without affecting the magnetic properties of the magnet. Once baking is complete, the ferromagnetic arrangement may be removed from the permanent magnet assembly to restore the magnet to its initial state.

Figure 7A:
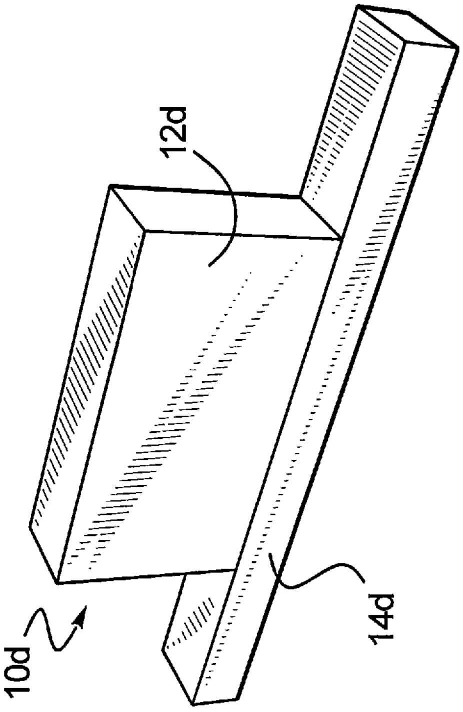
FIG. 7A is a perspective view of another permanent magnet assembly.

Turning now to FIG. 7A, an exemplary permanent magnet assembly 10*d* was soldered using the method previously described. As in the embodiment of FIG. 2, the assembly 10*d* includes a permanent magnet 12*d* soldered to a surface of a metal 14*d*. In the depicted embodiment the permanent magnet 12*d* is 1.00 in. long, 0.50 in. wide and 0.25 in. thick and is made of the N40SH grade NdFeB metal alloy, but in other embodiments, other dimensions and materials are possible. Moreover, the permanent magnet 12*d* is magnetized over its width and height resulting in tested demagnetization temperatures of 129° C. and 145° C., respectively. The metal 14*d* is a copper base that is 2.00 in. long, 0.25 in. wide and 0.25 in. thick and is soldered to the permanent magnet 12*d* using a 63/37 Tin-Lead alloy solder wire having a melting point of 183° C. As the solder melting point is much higher than both demagnetization temperatures of the permanent magnet 12*d*, conventional methods of soldering would surely demagnetize the magnet 12*d*.

Figure 7C:
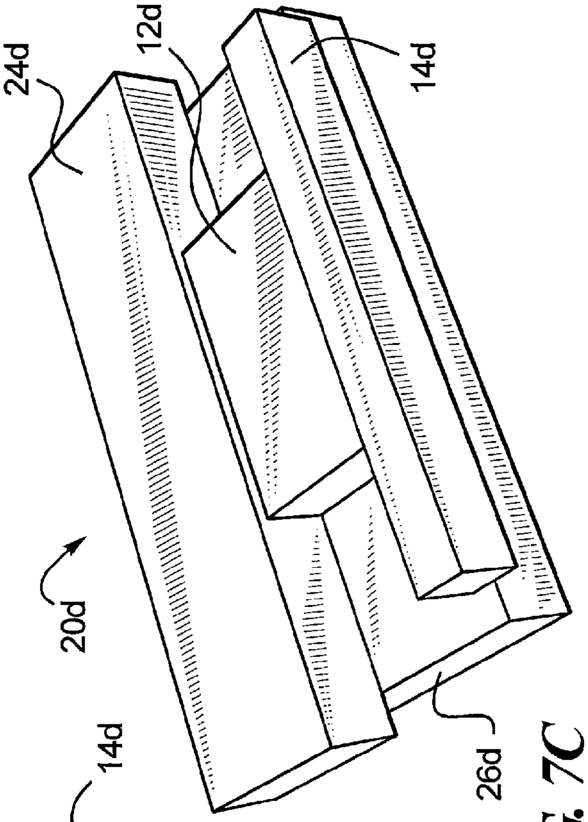
FIG. 7C is another perspective view of the ferromagnetic arrangement of FIG. 7B shown without a top section.
Figure 7B:
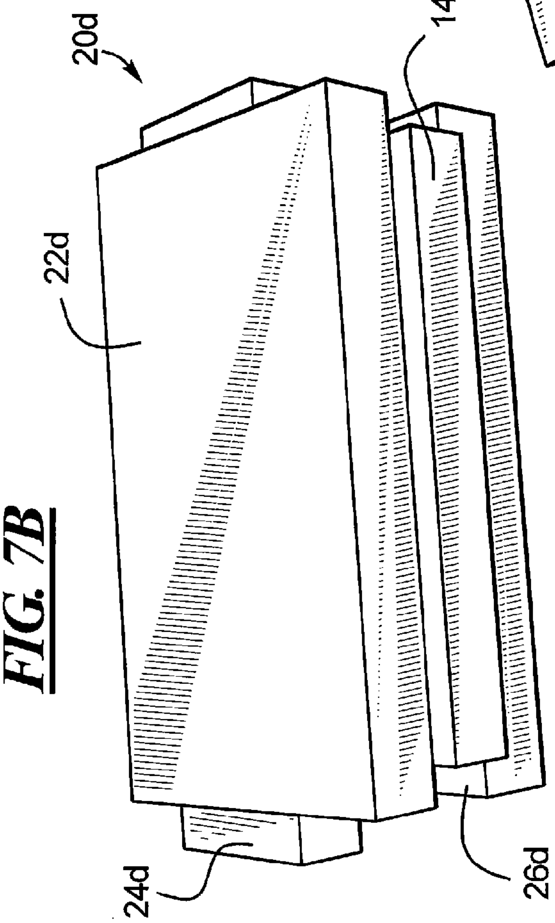
FIG. 7B is a perspective view of another ferromagnetic arrangement used to construct the permanent magnet assembly of FIG. 7A.

In order to temporarily raise the demagnetization temperatures of the permanent magnet 12*d* for the duration of soldering, the exemplary ferromagnetic arrangement 20*d* of FIGS. 7B and 7C may be employed. The arrangement 20*d* includes three separable steel plates or bodies for covering the permanent magnet 12*d* as in the previous embodiments of FIGS. 3A, 3B and 6B. The closed arrangement 20*d* of FIG. 7B shows a top section 22*d*, a side section 24*d* and a bottom section 26*d*. In the open arrangement 20*d* of FIG. 7C, the top section 22*d* (not shown) was removed to show the side section 24*d* and the bottom section 26*d* with the permanent magnet 12*d* positioned thereon. As shown in the embodiments of FIGS. 7B and 7C, the copper base 14*d* is positioned in close proximity to an exposed surface of the magnet 12*d*, while a flattened solder wire (not shown) is positioned between the permanent magnet 12*d* and the metal 14*d*. The completed arrangement 20*d* is held together with clamps, screws, bolts, adhesives, or the like so as to minimize any gaps within the arrangement 20*d* and the magnet 12*d*.

According to the theoretical models of FIGS. 6A and 6B and assuming that the ferromagnetic arrangement 20*d* will increase the demagnetization temperatures of the magnet 12*d* to at least 217° C., well over the solder melting point, the completed arrangement 20*d* is inserted into an oven. The baking temperature is preferably set to a temperature that is lower than the expected demagnetization temperature of 217° C., but greater than the soldering melting point of 183° C. Accordingly, the completed arrangement 20*d* was baked at 195° C. for 2 hours then removed from the oven to cool. Subsequently, the ferromagnetic arrangement 20*d* was removed from the permanent magnet 12*d* to provide the permanent magnet assembly 10*d* of FIG. 7A.

The finished exemplary permanent magnet assembly 10*d* was tested for significant changes to its magnetic properties. Using Helmholtz coils, the change in magnetic moment over the width was determined to be −1.39±0.02 %, while the change in magnetic moment over the height was −0.05±0.02 %. In accordance with the theoretical models of FIGS. 6A and 6B, the changes in the magnetic properties of the permanent magnet 12*d* before and after soldering were very minimal and tolerable.

Furthermore, the soldered layer between the permanent magnet 12*d* and the copper base 14*d* was tested for thickness and mechanical strength. In terms of thickness, the soldered layer was measured to be approximately 1/1000 of an inch, which is quite satisfactory. The strength of the soldered layer was tested by applying a load to the permanent magnet 12*d* while holding the assembly 10*d* only by the copper base 14*d*. Theoretically, the maximum load that a comparative permanent magnet may hold by pure magnetic force is calculated to be no more than 70N. However, experimental results determined that the permanent magnet 12*d* was able to hold a 760N load without breaking the soldered layer. A 760N load further implies a tensile stress of approximately 9.4 MPa. Typical Tin-Lead alloy solder have a tensile strength of 54 MPa. Therefore, in terms of mechanical strength, the soldered layer satisfies any reasonable magnetic assembly requirements.

Based on the foregoing, it can be seen that the present disclosure provides a method for raising a demagnetization temperature of a permanent magnet, at least temporarily, for specific high temperature processes such as soldering. The demagnetization temperatures of permanent magnets can be increased by arranging ferromagnetic material around the magnet. In this way, permanent magnets may be used in processes involving high levels of heat without risking demagnetization.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for temporarily raising a demagnetization temperature of a magnetized permanent magnet for use with a high temperature process, comprising the steps of:

providing an arrangement of ferromagnetic material around the magnetized permanent magnet so as to increase the demagnetization temperature to a second demagnetization temperature;

applying a high temperature process onto the magnetized peimanent magnet; and removing the arrangement of ferromagnetic material from the magnetized permanent magnet.

2. The method of claim 1, wherein the arrangement of ferromagnetic material completely covers at least three sides of the permanent magnet.

3. The method of claim 1, wherein the arrangement of ferromagnetic material includes at least a top section, a side section and a bottom section.

4. The method of claim 3, wherein the side and bottom sections of the arrangement of ferromagnetic material are made of a unitary body.

5. The method of claim 3, wherein the top, side and bottom sections of the arrangement of ferromagnetic material are made of a unitary body.

6. The method of claim 1, wherein the step of removing the arrangement of ferromagnetic material from the permanent magnet restores the permanent magnet to its initial state.

7. A method for temporarily raising a demagnetization temperature of a magnetized permanent magnet for soldering to a metal, comprising the steps of:

providing an arrangement of ferromagnetic material around the magnetized permanent magnet so as to increase the demagnetization temperature to a second demagnetization temperature;

positioning the metal in close proximity to the magnetized permanent magnet;

providing a solder between the magnetized permanent magnet and the metal, the solder having a melting point greater than the demagnetization temperature but lower than the second demagnetization temperature;

baking the solder to a baking temperature, the baking temperature being greater than the solder melting point but less than the second demagnetization temperature; and removing the arrangement of ferromagnetic material from the magnetized permanent magnet.

8. The method of claim 7, wherein the arrangement of ferromagnetic material completely covers at least three sides of the permanent magnet.

9. The method of claim 7, wherein the arrangement of ferromagnetic material includes at least a top section, a side section and a bottom section.

10. The method of claim 9, wherein the side and bottom sections of the arrangement of ferromagnetic material are made of a unitary body.

11. The method of claim 9, wherein the top, side and bottom sections of the arrangement of ferromagnetic material are made of a unitary body.

12. The method of claim 7, wherein the step of removing the arrangement of ferromagnetic material from the permanent magnet restores the permanent magnet to its initial state.

* * * * *